Figure 1:
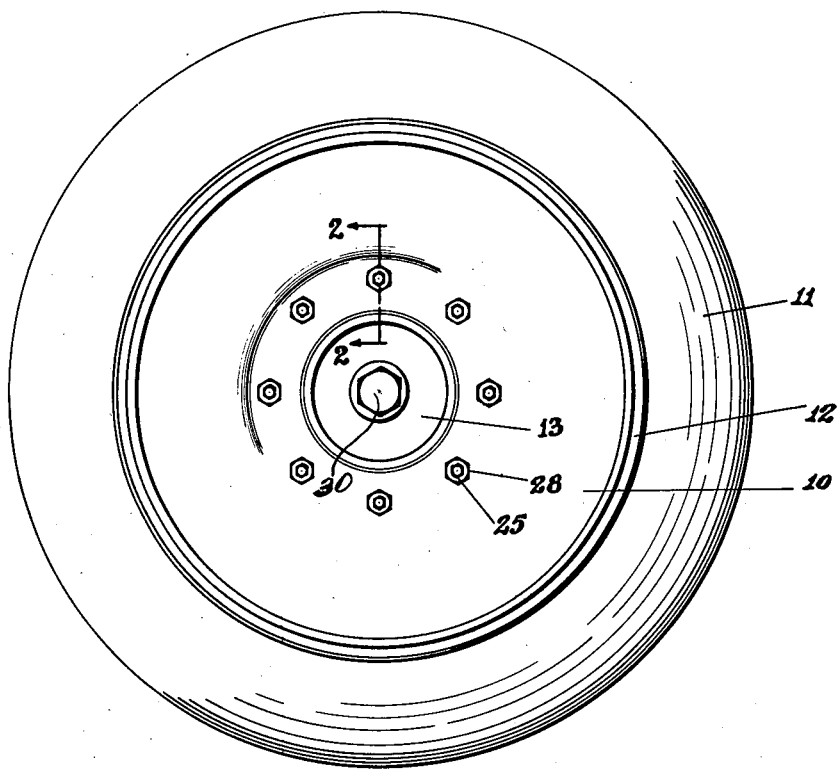

July 16, 1929.   E. A. NELSON   1,721,313
DEMOUNTABLE DISK WHEEL

Filed Feb. 7, 1924

WITNESS:-
Walter M. Prout

INVENTOR.
EMIL A. NELSON
BY
C. B. DesJardins
ATTORNEY.

Patented July 16, 1929.

1,721,313

UNITED STATES PATENT OFFICE.

EMIL A. NELSON, OF ABINGTON, PENNSYLVANIA, ASSIGNOR TO BUDD WHEEL COMPANY, OF PHILADELPHIA, PENNSYLVANIA, A CORPORATION OF PENNSYLVANIA.

DEMOUNTABLE DISK WHEEL.

Application filed February 7, 1924. Serial No. 691,115.

My invention relates to improvements in demountable wheels or wheel parts and has to do, more particularly, with certain improved devices for detachably mounting dual wheels or dual wheel parts, such as disk wheels, on a supporting central wheel part, such as a hub. In most of its aspects, the invention applies as well to other types of wheels as to disk wheels, although it is with disk wheels that it has been most advantageously practiced.

It has been proposed, in the disk wheel art, to use a dual wheel construction, particularly for the rear wheels of heavy trucks. Such dual wheels usually consists of a pair of disks which are detachably mounted on a single hub and each of which carries an independent rim and tire. Such disks are frequently dished and mounted on the common hub in reverse positions, so that the body portions of the disks diverge as they leave the hub. The main object of my present invention is to provide a dual wheel construction having improved means for detachably fastening the disks to the hub, such means being so constructed as to permit of the ready and convenient mounting and dismounting of the disk wheels. Another object of my invention is to provide a fastening means for dual disk wheels which will permit of the mounting and securing in position of the two disks independently of each other. It has been proposed, heretofore, to fasten both of the disks to the hub by a single set of nuts and this requires the operator to hold both of the disks in assembled position on the hub, at least until several of the fastening nuts are applied. This proved to be a difficult matter since the disks and tires were comparatively heavy and cumbersome and difficult for a single operator to manage. My invention permits the operator to mount one disk at a time and fasten it in assembled position and, thereafter, to mount the other disk and secure it in place without disturbing the mounting or fastenings for the first disk. A further object of my invention is to provide disk securing means for a dual wheel construction, which are of such a nature as to prevent any inadvertent loosening or release of the disks. Another object of my invention is to provide devices for attaching the disk wheels to the hub which can be manufactured at a low cost and which are particularly efficient in use.

Figure 2:
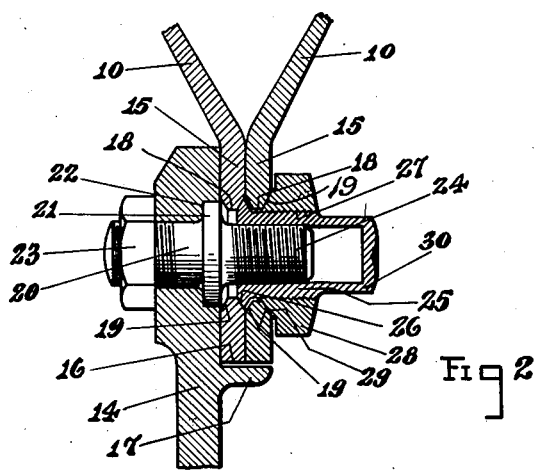

Further objects, and objects relating to details and economies of construction and operation, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a view, in side elevation, of a dual wheel construction embodying my invention, and Fig. 2 is a detail, sectional view, taken on the line 2—2 of Fig. 1.

In the drawings, the same reference numerals refer to the same parts throughout the several views, and the sectional view is taken looking in the direction of the arrows at the ends of the section line.

In general, my invention consists in providing a hub, a pair of wheel disks and means for detachably securing such disks to the hub, independently of each other so that the outer disk can be dismounted without disturbing the fastenings for the inner disk and so that the disks can be mounted on the hub and secured in place one at a time. In connection with the type of dual wheel construction in which the disks are provided with stud holes through which studs mounted on the hub flange extend, I propose to provide each of the studs with a pair of fastening devices, one for the inner disk and the other for the outer disk, so mounted on and cooperating with the stud that the fastening device for the outer disk can be removed or applied without disturbing the fastening device for the inner disk. More specifically, I propose to provide each stud with an elongated sleeve or cap nut having a portion engaging the inner disk to secure it in assembled position, and another nut screwed on the exterior of the sleeve or cap nut and engaging the outer disk to secure it in assembled position with respect to the hub and the first disk.

Referring to the numbered parts of the drawing, in which I have illustrated one preferred embodiment of my invention, I have shown, in Fig. 1, a dual wheel comprising a pair of disks, 10, mounted on a hub, 13, and each carrying a rim, 12, on which is mounted a tire, 11. The hub has a radial flange, 14, which carries a plurality of studs, 20, extending parallel to the axis of the hub and arranged at equal distances from said axis. These studs may be mounted on or secured to the hub flange in any desired manner. One manner of mounting the studs is shown, in which each stud has an annular flange, 21, fitting in a corresponding recess, 22, in the hub flange, 14. The rear portion of the stud extends from said flange, 21, through the hub flange and the stud is secured in place by a nut, 23, screwed on the rear end of the stud and engaging the rear face of the hub flange.

Each of the wheel disks, 10, has a central radial portion, 15, and a central opening, the edge of which is indicated at 16. The diameter of the central openings in the disks is such that there is a clearance between the edges of the central openings and the external surface of the shoulder, 17, on the hub flange. Each disk, 10, is provided, in the radial portion thereof, with a series of stud holes, 18, corresponding in number to the number of studs carried by the hub flange and so positioned that, when the disks are mounted on the hub, the studs pass through such holes. Each of the holes, 18, is countersunk so as to provide the beveled surfaces, 19, at each end of the hole.

Each stud, 20, has a portion, 24, which extends forwardly from the flange, 21, and is externally threaded. It will be noted that the external diameter of the portion, 24, of the stud is considerably less than the diameter of the stud holes, 18, through which it extends, so that there is considerable clearance between these parts. A cap nut, 25, is screwed on the portion, 24, of the stud and has an annular shoulder, at its rear end, provided with a beveled surface, 26, which engages the corresponding beveled surface, 19, at the edge of the stud hole, 18, in the inner disk, 10. When the cap nut is screwed up on the stud to bring these beveled surfaces into contact, the inner disk is clamped against the hub flange, 14, and the contact of the beveled surfaces, 26, of the several cap nuts, 25, with the beveled surfaces, 19, at the edges of the several stud holes in the inner disk, 10, serves to center the disk and to support it in centered position out of contact with the studs and the shoulder, 17, of the hub flange. The forward portion of the stud is externally threaded, at 27, and the diameter of this externally threaded portion is less than the internal diameter of the stud holes in the disks so that there is a clearance between the portion, 27, of the stud and the edge of the stud hole in the outer disk. The extreme forward portion, 30, of the cap nut may have a polygonal form so that it may be engaged by a wrench to rotate the nut. A nut, 28, is screwed upon the threaded portion, 27, of the cap nut and has a beveled surface, 29, contacting with the corresponding beveled surface, 19, at the outer edge of the stud hole, 18, in the outer disk. When the nuts, 28, are screwed home on the cap nuts, 25, so as to bring the beveled surfaces, 29 and 19, into contact, the outer disk is clamped against the inner disk and the outer disk is centered by the contact of the beveled surfaces, 29, with the corresponding beveled surfaces, 19, on the outer disk. It will be noted that the annular shoulder at the rear end of the cap nut, 25, is so formed that there is a clearance between it and the beveled surface, 19, at the inner edge of the stud hole, 18, in the outer disk. This is an advantageous feature because the outer disk is centered by the nuts, 28, independently of the cap nuts, 25, and variations or imperfections in the formation of the annular shoulder at the rear end of the cap nut do not affect the centering of the outer disk.

The outer disk can be removed by unscrewing and removing the nuts, 28, from the cap nuts on which they are threaded. This permits the removal and replacement of the outer disk and this can be done without disturbing in any way the mounting of the inner disk. The inner disk can be removed by unscrewing and removing the cap nuts, 25, screwed on the studs. When the operator wishes to mount the disks on the hub, he first holds the inner disk in position with the studs, 24, extending through the stud holes, 18. He then screws up the cap nuts, 25, and these center the inner disk and clamp it in position. After this has been done, he holds the outer disk in position with the cap nuts, 25, extending through the stud holes, 18, of the outer disk and screws up the nuts, 28. These center the outer disk and clamp it in position. This makes the mounting of the wheel a comparatively easy matter since the operator has to manage only one disk at a time and this can be done much more easily than would be the case if it were necessary to hold both disks in position while the fastening devices were applied. The construction is such that the nuts are automatically prevented from unscrewing, the two nuts cooperating with the disks after the manner of a jam nut so that they will not come loose inadvertently.

I am aware that the construction which I have described may be changed considerably without departing from the spirit of my invention and, therefore, I desire to claim my invention broadly, as indicated by the appended claims.

Having thus described my invention, what I claim as new and useful and desire to secure by Letters Patent is:

1. A dual wheel construction comprising a hub, a pair of wheel bodies mounted on said hub, each of said wheel bodies having a central radially extending portion, and means for securing said wheel bodies to the hub independently of each other and with their central radial portions arranged face to face.

2. A dual wheel construction comprising a hub, a pair of wheel bodies mounted on said hub, each of said wheel bodies having a central radially extending portion, and means for securing and centering said wheel bodies on the hub independently of each other and with their central radial portions arranged face to face.

3. A dual wheel construction comprising a hub, a pair of wheel bodies mounted on said hub, an annular series of devices for securing one of said wheel bodies to the hub independently of the other, and another annular series of devices for securing the other wheel body to the hub, the two series of securing devices having elements in common and each series of securing devices being provided with centering formations arranged to engage complemental formations on its wheel body serving to center its wheel body on the hub.

4. A dual wheel construction comprising a hub having a plurality of studs extending parallel to the axis thereof, a pair of wheel bodies mounted on said hub and having stud holes through which said studs extend, there being a clearance between the studs and the walls defining the stud holes, hollow members screwed on the studs and each having a beveled surface contacting with the walls defining the corresponding stud hole in the inner wheel body, and nuts screwed on said members and each having a beveled surface contacting with the walls defining the corresponding stud hole of the outer wheel body.

5. A dual wheel construction comprising a hub having a plurality of studs extending parallel to its axis, a pair of wheel bodies having stud holes through which said studs extend, cap nuts screwed on said studs and having centering surfaces contacting with corresponding surfaces on the inner wheel body to center said wheel body and clamp it to the hub, and nuts screwed on said cap nuts and having centering surfaces contacting with corresponding centering surfaces on the outer wheel body to center it and clamp it to the inner disk.

6. A dual wheel construction comprising a hub having a plurality of studs extending parallel to the axis thereof, a pair of wheel bodies mounted on the hub and having holes through which said studs extend, and a plurality of members screwed on said studs and having a head portion contacting with the inner wheel body to clamp the same on the hub, the external diameter of the body portion of said members being less than the diameter of the holes in said wheel bodies.

7. A dual wheel construction comprising a hub having a radial flange thereon, a pair of wheel bodies having contacting radial portions adapted to be clamped against said flange, said radial portions being provided with a plurality of registering stud holes the walls defining said stud holes being beveled to form an annular groove, and means for independently clamping said wheel bodies in position including as an element thereof a member having an annular shoulder for disposal in said groove of a depth and width less than said groove.

8. In a securing device for demountable dual wheels, a threaded member adapted to be secured to a hub flange and having a shoulder intermediate the ends thereof, a hollow member screwed on said threaded member and having a flange adapted to engage one of a pair of wheel bodies, and a nut member cooperating with said hollow member adapted to engage the other of said pair of wheel bodies, whereby to clamp said wheel bodies in position.

9. In a securing device for demountable dual wheels, a stud, an exteriorly and interiorly threaded nut screw-threadedly engaging said stud, and a second nut screw-threadedly engaging said first mentioned nut, each of said nuts having beveled portions thereof adapted for clamping engagement with complementally beveled portions of a pair of wheels.

10. In a securing device for demountable dual wheels, a stud adapted to be mounted in a flange of a wheel hub, a hollow nut member coacting with said stud, a nut coacting with the exterior surface of said nut member, and means on said nut member and nut for securely clamping and centering a pair of wheels against said flange.

11. A dual wheel construction comprising a hub, a pair of wheel disks mounted on said hub, means for independently securing said disks on the hub, the securing means being actuatable from the outer side of both of said disks.

12. A dual wheel construction comprising a hub, a pair of wheel bodies mounted on said hub and screw-threaded means for independently and coincidently centering each of said wheel bodies on the hub.

13. A dual wheel construction comprising a hub, a pair of wheel bodies mounted on said hub, each of said wheel bodies having a central radially extending portion, a plurality of threaded members carried by said hub and means engaging said threaded members for securing said wheel bodies to the hub independently of each other and with their central radial portions arranged face to face.

14. A demountable dual wheel construction comprising a central wheel part having a plurality of studs, a pair of outer tire-carrying wheel parts mounted on said central part, each of said tire-carrying wheel parts having a plurality of stud holes through which said studs extend, fastening devices carried by said studs and engaging one of said tire-carrying wheel parts to secure it to the central wheel part independently of the other tire carrying wheel part, and other fastening devices carried by said first-named fastening devices and engaging the other tire-carrying wheel part to secure it in position.

15. In a securing device for demountable dual wheel parts, a stud adapted to be mounted on a radial extension of a central wheel part and having a projecting threaded portion, means coacting with said threaded portion for clamping a demountable wheel part against said radial extension, and additional means coacting with said first-mentioned means for clamping a second demountable wheel part in place.

16. A dual wheel construction comprising a central wheel part provided with a radial extension, a pair of tire-carrying wheel parts, and an annular series of axially extending threaded fastening devices, carrying means for securing said tire-carrying wheel parts to said radial extension of the central wheel part independently of each other, said tire-carrying wheel parts and securing means having a concavo-convex face engagement, whereby the tire carrying wheel parts are independently centered on the securing means.

In testimony whereof, I affix my signature.

EMIL A. NELSON.